United States Patent [19]

Mertz

[11] Patent Number: 4,535,805
[45] Date of Patent: Aug. 20, 1985

[54] PILOT OPERATED VALVE WITH PRESSURE RELIEF

[75] Inventor: Denny W. Mertz, St. Louis County, Mo.

[73] Assignee: Emerson Electric Co., St. Louis, Mo.

[21] Appl. No.: 487,848

[22] Filed: Apr. 21, 1983

[51] Int. Cl.³ .............................................. F16K 31/12
[52] U.S. Cl. ................................... 137/489; 137/492; 137/492.5
[58] Field of Search ............ 137/489, 491, 492, 492.5; 251/30

[56] References Cited

U.S. PATENT DOCUMENTS

| | | | |
|---|---|---|---|
| 3,250,293 | 5/1966 | Adams et al. | 137/489 |
| 3,362,679 | 1/1968 | Le Wan | 251/30 |
| 3,806,081 | 4/1974 | Otto | 251/28 |
| 3,807,438 | 4/1974 | Posipsek | 137/489 |

FOREIGN PATENT DOCUMENTS

| | | | |
|---|---|---|---|
| 72694 | 4/1960 | France | 251/30 |
| 78877 | 6/1980 | Japan | 251/30 |

*Primary Examiner*—Henry C. Yuen
*Assistant Examiner*—John Kwon
*Attorney, Agent, or Firm*—Polster, Polster and Lucchesi

[57] ABSTRACT

A pilot operated valve is disclosed which may be used, for example, in a refrigerant system to control the flow of refrigerant therethrough. The valve has a pilot operated main valve therein which is selectively actuable by a solenoid. With the pilot valve closed, fluid pressure from the inlet side of the valve acts on the main valve so as to positively hold the main valve closed against a valve seat thereby to block the flow of refrigerant through the valve. The pilot valve member is biased toward its closed position both by a spring and by any fluid pressure within the valve downstream from the valve seat. Fluid pressure upstream from the valve seat acts on the pilot valve member so as to exert an opening force thereon. Upon the pressure differential across the main valve seat exceeding a predetermined value, the fluid pressure upstream from the valve seat acting on the pilot valve member overcomes the closing forces exerted on the pilot valve member and therefore opens the pilot valve member to relieve pressure from the back face of the main valve which in turn causes the main valve to open.

A method of relieving pressure from a pilot operated valve is also disclosed.

7 Claims, 6 Drawing Figures

PILOT OPERATED VALVE WITH PRESSURE RELIEF

BACKGROUND OF THE INVENTION

This invention relates to a pilot operated valve with pressure relief and to a method of relieving pressure on a pilot operated valve. Such pilot operated valves, and more particularly such pilot operated diaphragm valves may be utilized in a refrigeration system for liquid, suction, or hot gas refrigerant service, or in a steam distribution system or the like.

Typically, in many refrigerant circuits, remotely operable valves are provided for switching the refrigerant circuit from one mode of operation (e.g., a cooling mode) to another mode of service (e.g., a heating or defrosting mode). For example, in a supermarket refrigerated display case, the refrigerant system may undergo a heating and defrosting cycle periodically thereby to maintain the evaporator and other surfaces of the refrigeration system free of frost and ice. However, during the majority of the time, the refrigerant system will operate in a normal cooling mode and the heating and the defrosting cycle will last only a relatively short period of time. Typically, these remotely operable valves may be either normally open or normally closed, depending upon their location within the refrigerant circuits.

Heretofore, prior art solenoid operated refrigerant valves, such as illustrated in FIG. 6, were in common usage. As was typical, these prior art solenoid operated refrigerant valves had a pilot valve member movable between an open and a closed position by means of a solenoid actuator for selectively opening a pilot passage. When the pilot passage was closed, fluid pressure from the inlet or high pressure side of the pilot actuated valve would bleed through an orifice in the diaphragm valve and act against the back face of the diaphragm valve in such manner that the pressure force together with a spring force would move the diaphragm valve from its open to its closed position in engagement with the valve seat of the main flow path through the valve thereby blocking the flow of refrigerant. With the flow of refrigerant blocked, the pressure in the flow passage of the valve would be significantly less than the inlet pressure upstream from the valve seat and thus the fluid pressure on the backface of the diaphragm valve together with the spring force would positively hold the valve in its closed position. Upon energizing the solenoid actuator, the pilot valve member would be moved clear of the pilot valve seat thereby permitting the fluid pressure acting against the back face of the diaphragm valve to be relieved therefrom at a rate greater than fluid pressure could flow from the upstream side of the flow passage to the back face of the diaphragm valve thus permitting the fluid pressure on the downstream side of the diaphragm valve to force the diaphragm valve open against the bias of the spring acting to close the diaphragm valve.

In certain applications, it is desirable to limit the pressure difference across the solenoid valve to a predetermined upper limit. In order to limit the pressure across the solenoid valve to a predetermined limit, it was typical to provide a pressure relief valve in parallel with the solenoid operated valve, as illustrated in FIG. 5. This pressure relief valve would, of course, be actuated upon the pressure difference between the inlet and outlet side of a prior art solenoid operated valve exceeding a predetermined limit thereby permitting refrigerant to flow around the closed pilot operated solenoid valve. However, the requirement of providing this relief valve, together with the necessary tubing and fittings so as to incorporate the relief valve in the refrigerant circuit is complicated and therefore expensive.

Reference may be made to such U.S. patents as: U.S. Pat. Nos. 1,505,032, 2,705,608, 2,940,722, 3,114,532, 3,115,366, 3,208,716, 3,362,679, 3,363,433, 3,806,081, 3,943,795, and 4,270,276 for prior art valves in the same general field as the valve of the instant invention.

SUMMARY OF THE INVENTION

Among the several objects and features of the present invention may be noted the provision of a pilot operated diaphragm valve and method which may be readily utilized as a shutoff valve on a liquid or gas discharge refrigerant line so as to permit the automatic or remote switching of a refrigeration circuit from one mode of operation to another (e.g., between a normal cooling mode and a defrost mode);

The provision of such a pilot operated diaphragm and method which uses a solenoid for selective operation of the valve in which the magnetic components of the solenoid are relatively small and have low current draw characteristics;

The provision of such a pilot operated diaphragm valve and method which operates in any position and can be conveniently located in horizontal or vertical refrigerant lines;

The provision of such a pilot operated diaphragm valve which is operable between its opened and closed positions even with a relatively low differential pressure across the diaphragm of the valve;

The provision of such a pilot operated valve and method which when closed, is responsive to a pressure difference between the inlet and outlet side of the valve so as to relieve pressure across the valve when the pressure differential exceeds a predetermined limit;

The provision of such a pilot operated diaphragm valve and method which functions to modulate the pressure difference between the inlet and outlet side of the valve so as to maintain the pressure differential within predetermined upper and lower limits; and The provision of such a pilot operated diaphragm valve and method which is of rugged construction, which is reliable in operation, and which utilizes a large number of common components of already existing pilot operated diaphragm valves thereby substantially reducing production and inventory.

Briefly stated, a pilot-operated valve of this invention comprises a valve body having a flow path therethrough, the latter having an inlet and an outlet. The valve body has a main valve seat within the flow path. Main valve means is sealably mounted within the valve body for movement between an open position in which the main valve means is clear of the valve seat thereby to permit the flow of fluid through the flow path and a closed position in which the main valve means sealably engages the valve seat thereby to block the flow of fluid through the flow path. The valve body further has a chamber therewithin in which the main valve means is received as it moves between its closed and open positions. A fluid supply passage for communication between the flow path upstream from the valve seat and the chamber thereby to supply pressurized fluid to the chamber. Fluid pressure within the chamber acts to hold the main valve means in one of its stated positions. A pilot passage is provided for communication between the chamber and the flow path downstream from the valve seat. The pilot passage includes a pilot valve seat, a pilot valve member movable within the valve body between an open position in which the pilot valve member permits the flow of fluid from the chamber to the pilot passage and a closed position in which the pilot valve member is in sealing engagement with the pilot valve seat thereby to block the flow of fluid from the chamber via the pilot passage. Selectively actuable means is provided for effecting movement of the pilot valve between its opened and closed positions so that with the pilot valve open, fluid pressure within the chamber is less than the fluid pressure within the flow path upstream from the valve seat whereby the fluid pressure within the flow path maintains the main valve means in the other of its stated positions and so with the pilot valve member closed fluid pressure within the chamber increases so as to positively hold the main valve means in its the one position. The pilot passage has a first portion between the chamber and the pilot valve seat and a second portion between the pilot valve seat and the flow path downstream from the main valve seat. The pilot valve member has an area of sufficient size exposed to fluid pressure within the first portion of the pilot passage when the pilot valve member is in its closed position so as to overcome the bias of the spring forcing the pilot valve member toward its closed position upon the pressure differential of the fluid between the chamber and the flow passage downstream from the valve seat exceeding a predetermined value thereby to cause the pilot valve member to open which in turn effects movement of the main valve means from its one to its other position.

The method of this invention of automatically relieving pressure across a pilot operated valve upon the pressure difference between the inlet side and the outlet side of the pilot operated valve exceeding a predetermined level will now be disclosed. The pilot operated valve is essentially as above-described, and the steps of the instant method comprise closing the pilot valve member thereby to permit fluid pressure from the upstream side of the flow path to act upon the face of the main valve means opposite the valve seat when the main valve means is closed whereby the pressure on the back face of the main valve means positively maintains the main valve means in its closed position. The force of the fluid pressure within the flow passage on the downstream side of the valve seat acts on the pilot valve member via the pilot passage and further permits the biasing force of the spring to act on the valve member so as to force the pilot valve member toward its closed position. The fluid pressure within the flow passage on the upstream side of the main valve member acts against the pilot valve member in such manner as to force the pilot valve member from its closed to its open position whereby with the main valve means closed and whereby with the difference in pressure between the upstream and downstream sides of the valve seat exceeding a predetermined pressure differential, the force exerted on the pilot valve member by the fluid pressure upstream from the valve seat will overcome the pressure forces exerted on the pilot valve member by the spring and by the pressure forces of the fluid downstream from the valve seat thereby to force the pilot valve to its open position and so as to effect the opening of the main valve means thereby to reduce the pressure differential across the valve.

Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENTS

Figure 1:
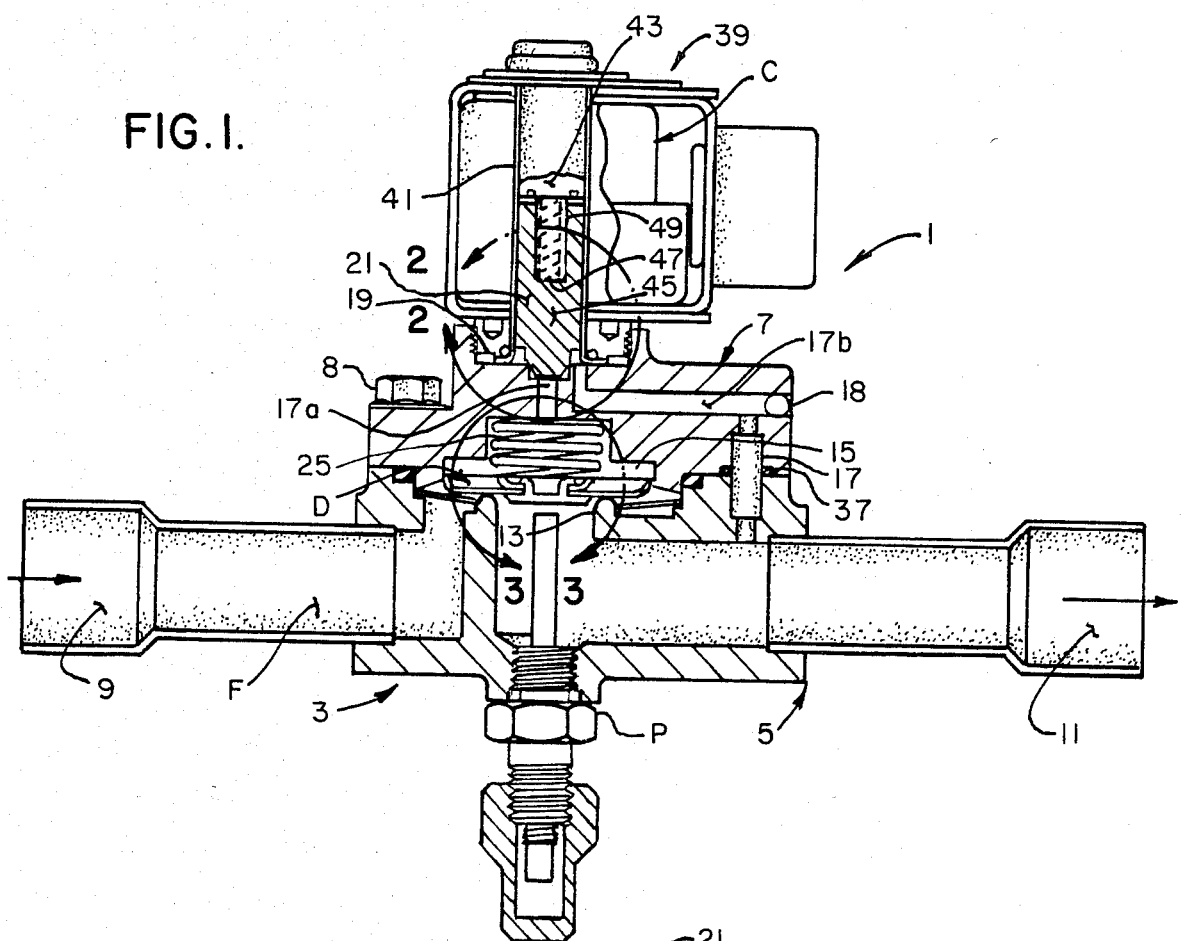
FIG. 1 is a vertical cross sectional view of a pilot operated valve of the present invention.
Figure 2:
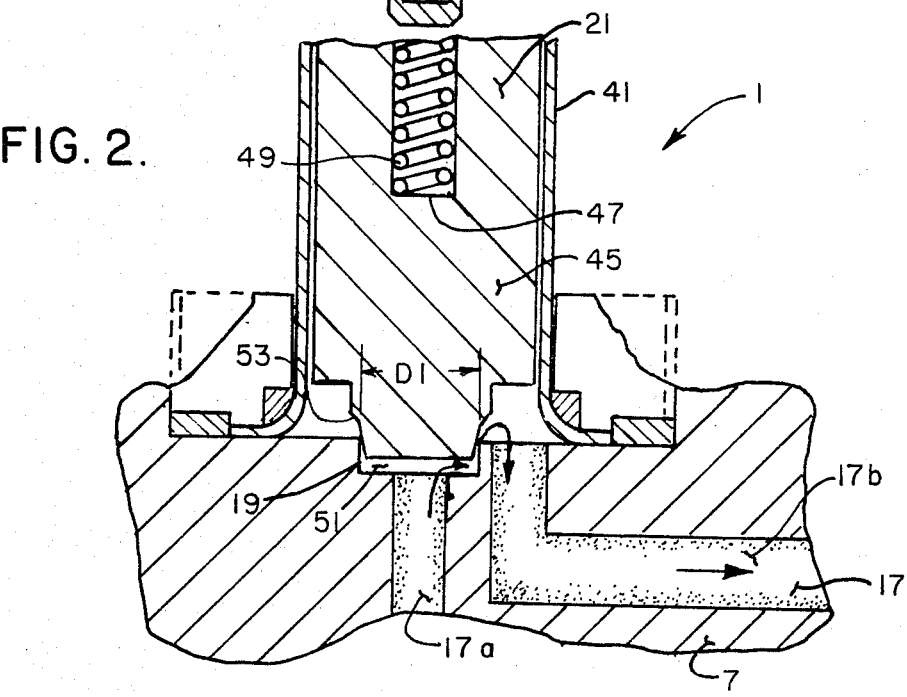
FIG. 2 is an enlarged view taken along line 2—2 of FIG. 1.
Figure 3:
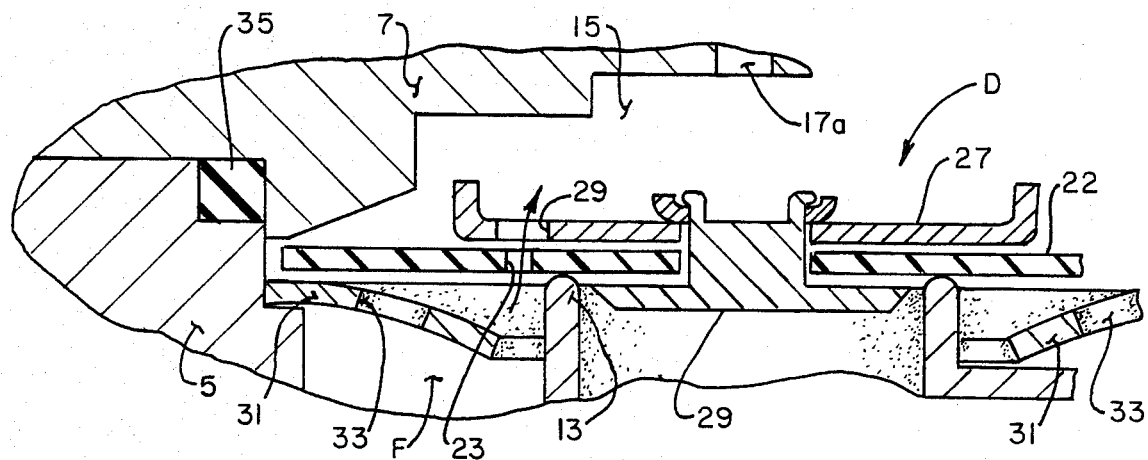
FIG. 3 is an enlarged view of a portion of the valve taken on line 3—3 of FIG. 1.

Referring now to the drawings, and particularly to FIGS. 1–3, a pilot operated valve of the present invention is indicated in its entirety by reference character 1. Valve 1 is shown to comprise a valve body or housing, as generally indicated at 3, comprising a bottom body assembly 5 and a top housing 7. As is typical, the top and bottom body portions are sealably bolted together by means of bolts 8 and are sealed relative to one another by gaskets or seals as will be hereinafter pointed out.

Valve body 3 is provided with a flow path F extending therethrough having an inlet end 9 and an outlet end 11. A main valve seat 13 is provided in the valve housing within flow path F and a flexible diaphragm valve, as generally indicated at D, is provided within the valve body for selective movement toward and away from valve seat 13 between an open position in which the main diaphragm valve D is clear of valve seat 13 thereby permitting fluid to flow through flow path F from inlet end 9 to outlet end 11 and a closed position, as illustrated in FIG. 1, in which the diaphragm valve is in sealing engagement with valve seat 13 thereby to block the flow of fluid through flow path F.

A diaphragm chamber, as generally indicated at 15, is provided in top housing 7 for receiving diaphragm valve D as the latter flexes or moves between its opened and closed positions. It will be understood that diaphragm valve D is sealably secured within valve body 3. The top body assembly 7 further includes a pilot passage, as generally indicated at 17, for providing communication between diaphragm chamber 15 and flow path F downstream from valve seat 13. A plug 18 is inserted into a portion of pilot passage 17 thereby to seal the pilot passage relative to the exterior of valve body 3. Pilot passage 17 further includes a pilot valve seat 19 and divides pilot passage 17 into a first portion 17a extending between chamber 15 and valve seat 19 and a second portion 17b extending between valve seat 19 and flow path F downstream from valve seat 13. A pilot valve, as generally indicated at 21, is reciprocably mounted within top body portion 7 for movement relative to the top body portion between an open position (as shown in FIG. 2) in which the pilot valve member is clear of pilot valve seat 19 and a closed position (as shown in FIG. 1) in which the pilot valve is in sealing engagement with pilot valve seat 19 thereby to prevent the flow of fluid from within diaphragm chamber 15 through pilot passage 17 to flow path F downstream from valve seat 13.

Diaphragm valve assembly D (see FIG. 3) includes an elastomeric diaphragm 22. A fluid supply port or passage 23 is provided in diaphragm 22 on the upstream side of valve seat 13 so that fluid within the inlet side of fluid passage F may be bled into diaphragm chamber 15 from the flow path F. The dimensions of pilot valve seat 19, pilot valve 21, pilot passage 17, and fluid supply port 23 are such as to permit fluid within diaphragm chamber 15 to be readily discharged from the diaphragm chamber via pilot valve passage 17 to flow path F downstream from valve seat 13 when pilot valve 21 is open at a rate faster than fluid pressure may enter chamber 15 via port or orifice 23.

Further, a compression coil spring 25 (see FIG. 1) is provided within diaphragm chamber 15 with the bottom end of this spring bearing against a metal cup or seat plate 27 carried by diaphragm 22. Seatplate 27 has a hole 29 therein generally in register with fluid supply port 23 in diaphragm 22. A center support member 29 is secured to seatplate 27. Diaphragm valve D further includes a diaphragm support ring 31 disposed below diaphragm 22 so as to support the latter within bottom assembly 5. Support ring 31 has a plurality of aperatures 33 therethrough so as to permit fluid to act against the upstream or front face of diaphragm 22 and to communicate with orifice 23. A gasket 35 is disposed between the upper and lower body portions and is sealingly held in position by bolts 8. In addition, a seal 37 (see FIG. 1) is provided in a groove surrounding a portion of pilot valve passage 17 at the interface of the lower and upper valve housing parts 5 and 7 thereby to seal pilot valve passage 17. A screw plug P is sealably installed in a threaded opening in the bottom of lower housing 5.

As generally indicated at 39 (see FIG. 1), means is provided for selectively actuating pilot valve member 21 between its open and closed positions thereby to effect movement of diaphragm valve D between its open position and its closed position. More specifically, actuating means 39 is shown to comprise an electrically operated solenoid. However, it will be understood that other actuating means, such as hydraulic or pneumatic actuators can be utilized within the broader scope of the instant invention. More specifically, the electrically operated solenoid actuator is shown to comprise an inner or enclosure tube 41 having a fixed core or armature 43 fixedly mounted therewithin at the upper end of the inner tube. A plunger 45 (which constitutes pilot valve member 21) is slidably mounted within the lower portion of inner tube 41. As is typical, both the upper armature 43 and the lower plunger 45 are made of iron or other suitable ferromagnetic material. Plunger 45 is selectively slidable within the tube and is axially movable between a de-energized position (as shown in FIG. 1) and an energized position (as shown in FIG. 2). Plunger 45 has a blind axial bore 47 in its upper end in which is received a compression coil spring 49 which exerts a biasing force on plunger 45 so as to bias the plunger downwardly towards its de-energized position in which it is spaced relatively far away from the lower end of fixed core 43. An electrical coil C surrounds tube 47 and is provided with suitable electrical leads (not shown) for selective energization and de-energization of the coil. Upon energization of coil C, the magnetic flux generated by the coil forceably draws movable plunger 45 from its de-energized or outward position (as shown in FIG. 1) to its energized position. This, of course, causes pilot valve 21 to move clear of pilot valve seat 19 and to open communication between chamber 15 and flow path F downstream from valve seat 13 via pilot passage 17.

As best shown in FIG. 2, the bottom end of inner tube 41 is sealably secured to upper body portion 7 and, as is conventional, the upper end of the inner tube is closed. Pilot valve passage 17a extending between chamber 15 and pilot valve seat 19 is shown to open into a valve piston chamber or cylinder 51 which is considerably larger than the cross-section of pilot valve passage 17a. The diameter of cylinder 51 is indicated by D1. Further, the lower end of pilot valve member 21 is shown to be a tapered plug type valve having tapered sidewalls 53 which extend down into cylinder 51 and, when pilot valve member 21 is seated on valve seat 21, the valve seat engages the upper portions of taper 53 so as to positively block the flow of fluid through pilot valve passage 17. However, upon valve member 21 moving from its closed toward its open position, taper 53 progressively increases the open area of the pilot valve so as to increase the bleed flow of fluid from chamber 15 through pilot passage 17 in a generally nonlinear relationship with the position or stroke of pilot valve member 21. As will be described in greater detail hereinafter, the taper 53 of pilot valve member 21 permits self-regulating or modulating operation of valve 1 of this invention in response to the pressure difference between inlet 9 and outlet 11 of valve 1 when diaphragm valve D is in its closed position.

It will further be appreciated that with pilot valve 21 seated on valve seat 19, fluid pressure from the downstream side of valve seat 13 via pilot passage portion 17b surrounds valve member 21 within tube 41 and cooperates with spring 49 so as to bias or force valve member 21 toward its closed position. Further, it will be appreciated that with the pilot valve member 21 closed, fluid pressure within chamber 15 acts on the bottom face of valve member 21 across the area of cylinder 51 and thus tends to counteract the closing forces exerted on pilot valve member 21 by spring 49 and by fluid pressure within the downstream portion of the downstream pilot passage portion 17b.

Thus, in accordance with this invention, with diaphragm valve D closed, and with the pressure of the fluid on the inlet side of valve 1 equalized within chamber 15, the pilot valve member has its bottom area, as indicated by diameter D1, exposed to fluid pressure at the inlet pressure of valve 1 so that the pressure force exerted on the pilot valve member 21 will overcome the bias of spring 49 and the pressure forces exerted on pilot valve member 21 by the fluid pressure within pilot passage portion 17b upon the pressure differential between the fluid within the chamber 15 (i.e., the upstream or inlet pressure) and the downstream pressure (i.e., the pressure in outlet 11 of valve 1) exceeding a predetermined value thereby to cause pilot valve member 21 to move from its closed to its open position which in turn effects movement of diaphragm valve D from one of its positions (i.e., its closed position) to its other position (i.e., its open position) so as to reduce the pressure differential between the inlet 9 and outlet 11 of valve 1. It will further be appreciated that due to taper 53 of valve 21, the pressure forces acting on diameter D1 of the pilot valve, and the force of spring 49 and of fluid in outlet passage 17b will be balanced (i.e., in equilibrium) at some valve position such that the pressure differential between the inlet and outlet sides of valve 1 may be modulated or regulated at a predetermined pressure level. This equilibrium pressure differential may be changed from one predetermined level to another by varying the spring constant of spring 49 or by varying the area of cylinder 51.

Referring to FIG. 3, it will be seen that with diaphragm valve D in its closed position, the flow of fluid through flow path F is blocked by the engagement of diaphragm 22 on valve seat 13. Thus, valve seat 13 divides diaphragm valve D into a first area which comprises essentially the entire cross-sectional area of the backface of diaphragm 22 (i.e., the face toward chamber 15) and a second cross-sectional area which comprises the downstream cross-sectional area of valve seat 13. It will be appreciated with diaphragm valve D closed, the fluid pressure at substantially the pressure level of the fluid on the inlet side 9 of valve 1 is exerted over the entire backface of diaphragm 22 while a lower fluid pressure, as is present at outlet 11, is exerted on the front face or downstream side of the diaphragm valve within valve seat 13 thus causing an imbalance of pressure forces on diaphragm valve D. This imbalance of pressure forces together with the downward biasing of spring 25 positively holds diaphragm valve D in its closed position. However, upon opening of pilot valve member 21 so as to bleed pressure from within chamber 15 to the downstream side of flow path F at a rate faster than fluid may enter chamber 15 via supply port 23, the pressure imbalance will reverse such that fluid pressure on the upstream face of diaphragm 22 on the upstream side of valve seat 13 will, together with the pressure forces acting on the downstream face of the diaphragm within valve seat 13, exert an upward force on diaphragm valve D sufficient to overcome the bias of spring 25 and to forceably move the diaphragm valve D from its closed to its open position.

Figure 4:
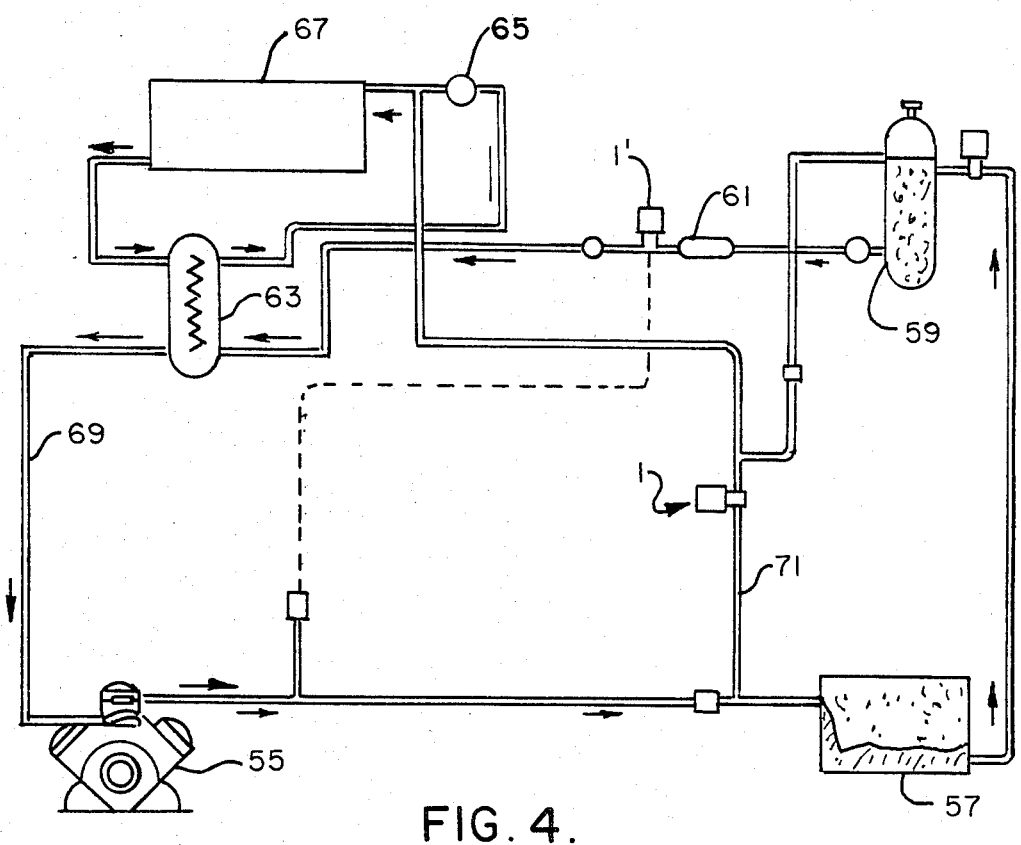
FIG. 4 is a semi-diagrammatic view of a refrigeration system incorporating a pilot operated diaphragm valve of the present invention for enabling the refrigeration system to be selectively switched from a normal cooling mode to a defrost mode and vice versa.

Referring now to FIG. 4, a typical refrigeration circuit using pilot operated diaphragm valves of the present invention is illustrated. More specifically, this refrigerant system is shown to comprise a refrigeration compressor 55 which directs hot, compressed refrigerant to a condensor 57 which in turn directs a warm liquid to a receiver 59. The warm liquid then flows through a filter/dryer 61 and through a normally open pilot operated diaphragm valve of the present invention, as indicated by reference character 1' to a heat exchanger 63. The liquid refrigerant is then expanded through a thermostatic expansion valve 65 into an evaporator coil 67. The refrigerant is then returned to the suction side of compressor 55 by means of a suction line 69. A normally closed, hot gas solenoid, pilot operated valve 1 of the present invention is provided in a line 71 between the inlet to condensor 57 and the inlet to evaporator coil 67 downstream from expansion valve 65. In a defrosting mode, both the normally open pilot operated solenoid valve 1' and the normally closed hot gas solenoid, pilot operated diaphragm valve 1 are energized thereby to block the flow of refrigerant through valve 1' and to permit the flow of hot gas through valve 1 to the evaporator coil 67 thereby to defrost the latter. At the end of the defrosting cycle, both solenoid valves 1 and 1' are de-energized thereby permitting the normally open valve 1' to again assume its normally open position and to close the normally closed valve 1.

Figure 5:
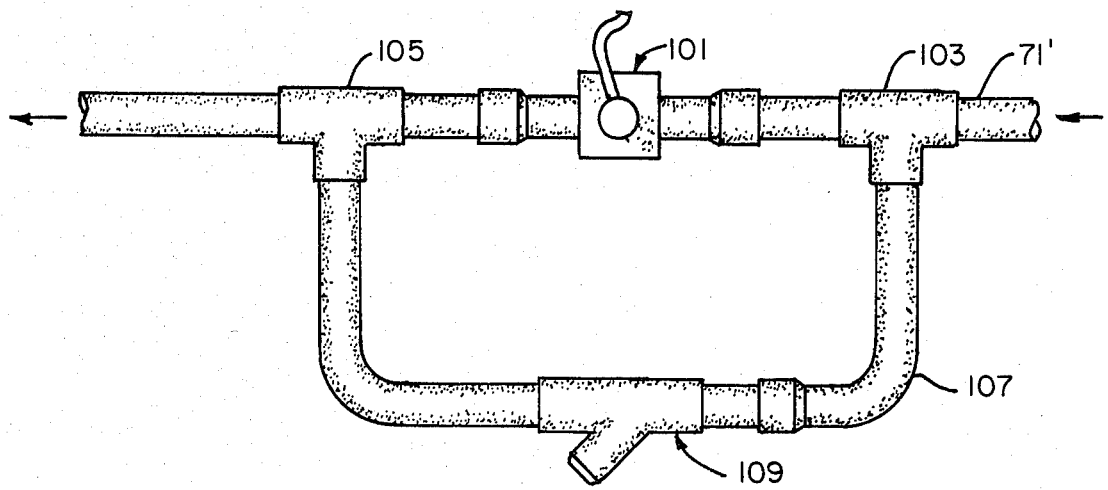
FIG. 5 is a view of a portion of a refrigerant system, such as illustrated in FIG. 4, incorporating a prior art pilot operated diaphragm valve with a pressure relief valve connected in parallel with the prior art pilot operated diaphragm valve so as to limit the pressure differential across the pilot operated diaphragm level to a predetermined level.
Figure 6:
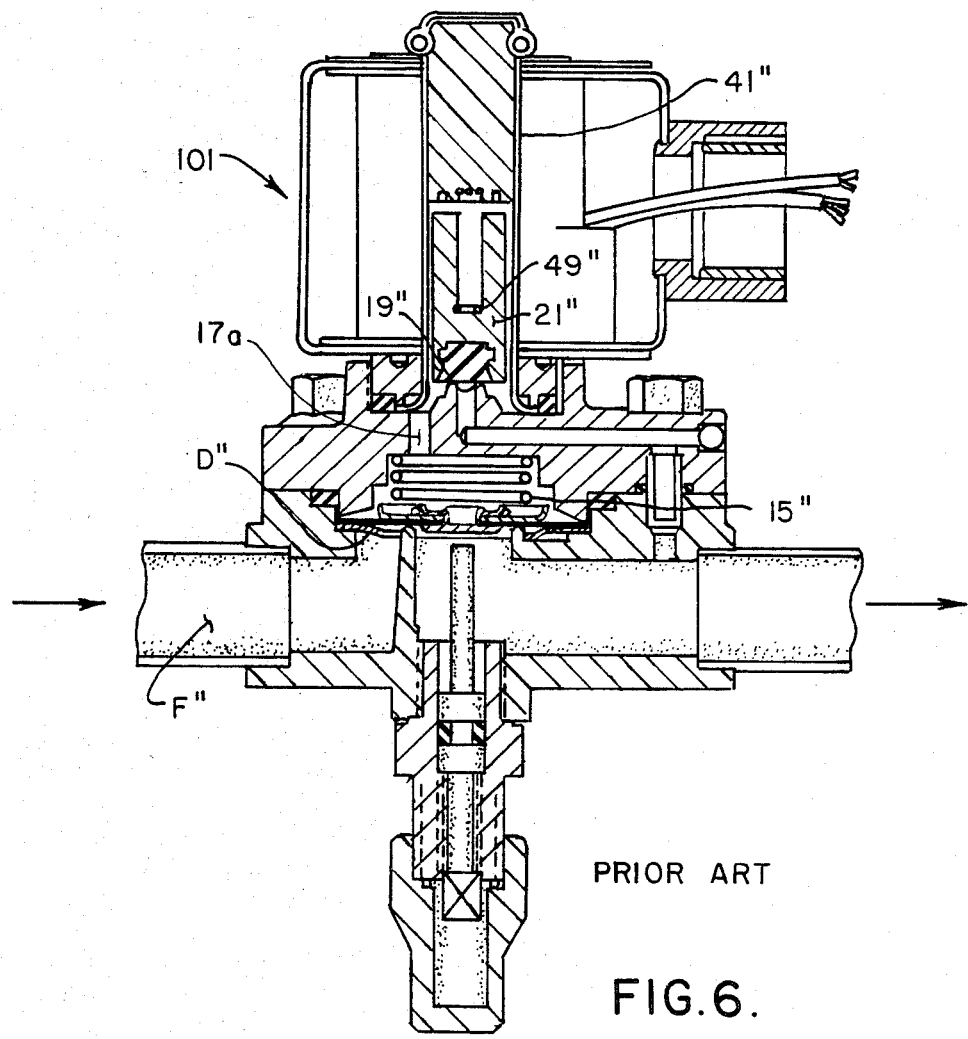
FIG. 6 is a cross sectional view of a prior art solenoid, pilot operated, normally closed diaphragm valve.

Referring to FIGS. 5 and 6, FIG. 5 depicts a portion of a refrigerant circuit similar to the refrigerant line 71 in FIG. 4 in which a prior art normally closed pilot operated solenoid valve is indicated in its entirety by reference character 101. As seen, on the upstream side of the prior art valve 101, a tee connection 103 is provided and, on the downstream side of valve 101 a second tee connection 105 is provided with a parallel circuit 107 generally in parallel to valve 101. A pressure relief valve 109 is provided in parallel circuit 107 which is in its normally closed position thereby blocking the flow of refrigerant through line 107 around valve 101 when the pressure difference between the inlet and outlet sides of valve 101 is below a predetermined level. However, upon this pressure differential exceeding a predetermined level, pressure relief valve 109 will open thereby relieving the pressure differential to a level below the aforementioned predetermined pressure level.

In FIG. 6, a typical prior art normally closed pilot operated diaphragm valve is indicated in its entirety by reference character 101. Generally, the details of the diaphragm valve D' of this prior art valve are similar in construction to diaphragm valve D of the valve 1 present invention and thus a detailed disclosure will not be provided. However, it should be noted that pilot valve member 21' of prior art valve 101 is exposed to fluid pressure within diaphragm chamber 15' via pilot valve passage 17a' such that the pressure in the inlet of flow path F' of the prior art valve surrounds pilot valve member 21' within inner tube 41' so as to cooperate with pilot valve biasing spring 49' to maintain pilot valve member 21' in its closed position on pilot valve seat 19'. Thus, upon an increase in pressure differential between the inlet and outlet ends of prior art valve 101, the increase in pressure tends to aid the closing forces exerted on the pilot valve member 21' and thus even more positively keeps the pilot valve member in its closed position.

Thus, in comparing the prior art valve 101 (as shown in FIGS. 5 and 6) with the valve 1 of the present invention, it will be seen that in many applications the requirement of a parallel branching circuit 107 together with a pressure relief valve 109 therein are eliminated, and the valve 1 of the present invention will operate automatically to relieve pressure across the valve in the event the pressure differential between the inlet and outlet of the valve 1 of the present invention exceeds a predetermined pressure level.

Further, in accordance with the present invention, a method of automatically relieving pressure across a pilot operated diaphragm valve is disclosed. This method presupposes that a diaphragm valve, similar in construction to valve 1 heretofore described, is utilized. Succinctly, this method includes the steps of closing the pilot valve member 21 thereby to permit fluid pressure from the upstream or inlet side of flow path F to act upon the backface of diaphragm valve D opposite valve seat 13 when the diaphragm valve is closed (i.e., in engagement with valve seat 13) so that the pressure on the backface of the diaphragm valve (the pressure within chamber 15) positively maintains the diaphragm valve in its closed position sealingly engaging valve seat 13. Then, the force of the fluid pressure within the flow passage F on the downstream side of valve seat 13 is permitted to act on pilot valve member 21 via pilot passage 17b and further the biasing force of spring 49 is permitted to act on the pilot valve member so both the outlet pressure and the spring force the pilot valve member toward its closed position in engagement with pilot valve seat 19. The fluid pressure within flow passage F on the upstream side of the valve is permitted to act against the pilot valve member (i.e., permitted to act against diameter D1 of valve 21 in cylinder 51 as shown in FIG. 2) in such manner as to force the pilot valve member from its closed position (as shown in FIG. 1) to its open position (as shown in FIG. 2). Thus, with the diaphragm valve D closed and with the difference in pressure between the upstream and downstream sides of valve seat 13 exceeding a predetermined pressure differential, the force exerted on the pilot valve member by the fluid pressure upstream from valve seat 13 will overcome the closing forces exerted on the pilot valve member by spring 49 and by the pressure forces exerted on the valve member by fluid within pilot passage 17b thereby to force the pilot valve toward its open position and to effect the opening of diaphragm valve D so as to reduce the pressure differential across the valve. Further, as heretofore pointed out, taper 53 on pilot valve 21 permits a modulating release of pressure from the backface of the diaphragm valve D thereby to modulate or regulate the flow of fluid through flow path F of valve 1 to a predetermined pressure difference level.

In view of the above, it will be seen that the other objects of this invention are achieved and other advantageous results obtained.

As various changes could be made in the above constructions or methods without departing from the scope of the invention, it is intended that all matter contained in the above description or shown in the accompanying drawing shall be interpreted as illustrative and not in a limiting sense.

What is claimed is:

1. In a pilot-operated valve comprising a valve body having a flow path therethrough, the latter having an inlet and an outlet, said valve body having a valve seat within said flow path and main valve means sealably mounted within said valve body for movement between an open position in which said main valve means is clear of said valve seat thereby to permit the flow of fluid through said flow path and a closed position in which said main valve means sealably engages said valve seat thereby to block the flow of fluid through said flow path, said valve body further having a chamber therewithin in which said main valve means is received as it moves between its closed and open positions, a fluid supply passage for communication between said flow path upstream from said valve seat and said chamber for supplying pressurized fluid to said chamber, fluid pressure within said chamber acting to hold said main valve means in one of its stated positions, a pilot passage for communication between said chamber and said flow path downstream from said valve seat, said pilot passage including a pilot valve seat, a pilot valve member movable relative to said pilot valve seat between an open position in which said pilot valve member permits the flow of fluid from said chamber via said pilot passage to said flow path downstream from said valve seat and a closed position in which said pilot valve member is in sealing engagement with said pilot valve seat thereby to blook the flow of fluid from said chamber, a spring for biasing said pilot valve member toward its closed position, and selectively actuable means for effecting movement of said pilot valve between its said one and the other of its said positions so that with said pilot valve open, fluid pressure within said chamber being less than the fluid pressure within said flow path whereby the fluid pressure within the flow path maintains said valve means in its said one position and so with the pilot valve member closed fluid pressure within said chamber increases so as to positively hold the valve means in its said other position, wherein the improvement comprises: said pilot passage having a first portion between said chamber and said pilot valve seat and a second portion between said pilot valve seat and said flow path downstream from said valve seat, said pilot valve member having an area of sufficient size exposed to fluid pressure within said first portion of said pilot passage when said pilot valve member is in its closed position so as to overcome the bias of said spring forcing said pilot valve member toward its closed position upon the pressure differential of said fluid between said chamber and said flow passage downstream from said valve seat exceeding a predetermined level thereby to cause said pilot valve member to open which in turn effects movement of said main valve means from its said one to its said other position.

2. In a pilot operated valve as set forth in claim 1 wherein said pilot valve member is so structured relative to said pilot valve seat that said pilot valve member modulates the flow of fluid from said chamber as said pilot valve member moves from its closed position toward its open position.

3. In a pilot operated valve as set forth in claim 1 wherein said selectively actuable means for effecting movement of said pilot valve member comprises a solenoid actuator including a moveable armature and a selectively energizable coil surrounding at least in part said movable armature whereby upon energization and de-energization of said coil, said movable armature is caused to moved substantially axially with respect to said coil and to effect movement of said pilot valve member between its opened and closed positions.

4. In a pilot operated valve as set forth in claim 1 wherein said main valve means is a diaphragm valve, said pilot operated valve further comprising a diaphragm spring interposed between said valve body and said diaphragm valve for biasing said diaphragm valve toward its said other position.

5. In a pilot operated valve as set forth in claim 4 wherein when said diaphragm valve is in its closed position in sealing engagement with said valve seat in said flow path, said diaphragm valve has a first area upon which fluid pressure on the upstream side of said valve seat acts and a second area on which the fluid pressure within the flow path on the downstream side of said flow path acts whereby with said diaphragm valve means closed and with said pressure on the downstream side of said valve seat less than the pressure on the upstream side of said valve seat and with the pilot valve member closed, the fluid pressure within said chamber acting on the portion of said diaphragm valve means constituting said second area thereof together with the biasing force of said diaphragm spring holds said diaphragm valve closed relative to said valve seat.

6. In a pilot-operated diaphragm valve comprising a valve body having a flow path therethrough, the latter having an inlet and an outlet, said valve body having a main valve seat within said flow path and diaphragm valve means sealably mounted within said valve body for movement between an open position in which said diaphragm valve means is clear of said main valve seat thereby to permit the flow of fluid through said flow path and a closed position in which said diaphragm valve means sealably engages said main valve seat thereby to block the flow of fluid through said flow path, said valve body further having a chamber therewithin in which said diaphragm valve means is received as it moves between its closed and open positions, a fluid supply passage for communication between said flow path upstream from said main valve seat and said chamber thereby to supply pressurized fluid to said chamber, fluid pressure within said chamber acting to hold said diaphragm valve means in one of its stated positions, a pilot passage for communication between said chamber and said flow path downstream from said main valve seat, said pilot passage including a pilot valve seat, a pilot valve member movable relative to said pilot valve seat between an open position in which said pilot valve member permits the flow of fluid from said chamber to said pilot passage and a closed position in which said pilot valve member is in sealing engagement with said pilot valve seat thereby to block the flow of fluid from said chamber via said pilot passage, said pilot valve seat and said pilot passage being sized relative to said fluid supply passage so that when said pilot valve member is open, fluid pressure within said chamber is below the pressure of the fluid in said flow passage on the inlet side of said main valve seat, the side of said diaphragm valve means in communication with said chamber having a cross-sectional area larger than the opposite face of the diaphragm valve means exposed to fluid pressure in said flow path on the downstream side of said main valve seat when said diaphragm valve means is in its closed position and being of substantially the same cross sectional area when said diaphragm valve means is open, a spring engagable with said pilot valve member thereby to bias the latter toward its closed position, and selectively actuable means for effecting movement of said pilot valve between its opened and closed positions so that with said pilot valve open, fluid pressure within said chamber is less than the fluid pressure within said flow path whereby the fluid pressure within the flow path maintains said diaphragm valve means in one of its stated positions and so with the pilot valve member closed fluid pressure within said chamber increases so as to positively hold the diaphragm valve means in another of its said positions, wherein the improvement comprises: said pilot passage having a first portion between said chamber and said pilot valve seat and a second portion between said pilot valve seat and said flow path downstream from said main valve seat, said pilot valve member having an area of sufficient size exposed to fluid pressure within said first portion of said pilot passage when said pilot valve member is in its closed position so as to overcome the bias of said spring forcing said pilot valve member toward its closed position and to overcome the fluid pressure forces acting on said pilot valve member via said second portion of said pilot passage upon the pressure differential of said fluid between said inlet and outlet of said pilot operated diaphragm valve exceeding a predetermined value thereby to cause the pilot valve member to open which in turn effects movement of said diaphragm valve means from its said one to its said other position.

7. A pilot operated valve which automatically opens upon the pressure differential across said valve exceeding a predetermined limit, said pilot operated valve having a flow path therethrough including an inlet and an outlet, a main valve seat constituting a portion of said flow path and a main valve member movable relative to said main valve seat between an open position in which flow of fluid occurs through said flow path and a closed position in which said main valve member sealing cooperates with said main valve seat thereby to block the flow of fluid through said flow path, a space receiving said main valve member, a passage permitting fluid from the upstream side of said main valve seat to enter said space and to act on said main valve members to at least in part aid in maintaining said main valve in its closed position, a pilot valve passage providing communication between said space and said flow path downstream from said main valve seat, said pilot passage including a pilot valve seat and a pilot valve member movable between a closed position cooperable with said pilot valve seat so as to block the flow of fluid from said space whereby said main valve is maintained in its closed position and an open position in which fluid within said space is exhausted to said flow path downstream from said main valve seat at a rate faster than fluid enters said space thereby to permit opening of said main valve, said pilot valve member being biased toward its closed position by a spring, said pilot passage having a first portion between said space and said pilot valve seat and a second portion between said pilot valve seat and said flow path downstream from said valve seat, said pilot valve member having an area of sufficient size exposed to fluid pressure within said first portion of said pilot passage when said pilot valve member is in its closed position so as to overcome the bias of said spring forcing said pilot valve member toward its closed position upon the pressure differential of said fluid between said space and said flow passage downstream from said valve seat exceeding a predetermined level thereby to cause said pilot valve member to open which in turn effects movement of said main valve means from its said closed position to its said open position.

* * * * *